(12) United States Patent
Nakamura

(10) Patent No.: US 12,086,619 B2
(45) Date of Patent: Sep. 10, 2024

(54) FUNCTION COORDINATION DEVICE, VIRTUAL MACHINE COMMUNICATION SYSTEM, AND FUNCTION COORDINATION METHOD

(71) Applicant: Nippon Telegraph and Telephone Corporation, Tokyo (JP)

(72) Inventor: Tetsuro Nakamura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 968 days.

(21) Appl. No.: 16/964,702

(22) PCT Filed: Feb. 5, 2019

(86) PCT No.: PCT/JP2019/004079
§ 371 (c)(1),
(2) Date: Jul. 24, 2020

(87) PCT Pub. No.: WO2019/156077
PCT Pub. Date: Aug. 15, 2019

(65) Prior Publication Data
US 2021/0055950 A1    Feb. 25, 2021

(30) Foreign Application Priority Data

Feb. 7, 2018  (JP) ................................ 2018-019802

(51) Int. Cl.
*G06F 9/455* (2018.01)
*H04L 49/25* (2022.01)
*H04L 49/90* (2022.01)

(52) U.S. Cl.
CPC .......... *G06F 9/45558* (2013.01); *H04L 49/25* (2013.01); *H04L 49/90* (2013.01);
(Continued)

(58) Field of Classification Search
None
See application file for complete search history.

(56) References Cited

U.S. PATENT DOCUMENTS 9,960,955 B2 *   5/2018   Nakagawa ............... H04L 41/40
2010/0002577 A1 * 1/2010   Moreno ................ H04L 41/082
                                                              370/220

(Continued)

OTHER PUBLICATIONS

Ogawa et al., "Proposal and Evaluation of Soft Patch Panel for Fast and Flexible Virtual Machine-to-Virtual Connections," Institute of Electronics, Information and Communication Engineers, 2016, 116(322):85-90, 13 pages (with Machine Translation).

*Primary Examiner* — Lewis A Bullock, Jr.
*Assistant Examiner* — Melissa A Headly
(74) *Attorney, Agent, or Firm* — Fish & Richardson P.C.

(57) ABSTRACT

A patch controller, when removal of a to-be-deleted node on a virtual path is detected, extracts a node immediately before deletion located adjacently to and on an upstream side of the to-be-deleted node on the virtual path and a node immediately after deletion located adjacently to and on a downstream side of the to-be-deleted node, forms a bypass path for discharging a queued packet being processed by the to-be-deleted node to the node immediately after deletion, and a changed path excluding the to-be-deleted node from the virtual path, by making a connection so as to cause a transfer packet from the node immediately before deletion to flow to the node immediately after deletion, and prioritizes processing of discharging the queued packet to the node immediately after deletion on the bypass path over processing of transferring the transfer packet to the node immediately after deletion on the changed path.

5 Claims, 13 Drawing Sheets

(52) U.S. Cl.
    CPC .............. *G06F 2009/45562* (2013.01); *G06F 2009/45595* (2013.01)

(56)                    References Cited

U.S. PATENT DOCUMENTS

2010/0265916  A1*  10/2010  Cheon ............... H04W 36/0011
                                                        370/331
2011/0261723  A1*  10/2011  Yamato .................. H04L 45/66
                                                        370/255
2018/0227170  A1*   8/2018  Wang ...................... H04L 41/40

\* cited by examiner

FUNCTION COORDINATION DEVICE, VIRTUAL MACHINE COMMUNICATION SYSTEM, AND FUNCTION COORDINATION METHOD

CROSS-REFERENCE TO RELATED APPLICATIONS

This application is a National Stage application under 35 U.S.C. §371 of International Application No. PCT/JP2019/004079, having an International Filing Date of Feb. 5, 2019, which claims priority to Japanese Application Ser. No. 2018-019802, filed on Feb. 7, 2018. The disclosure of the prior application is considered part of the disclosure of this application, and is incorporated in its entirety into this application

TECHNICAL FIELD

The present invention relates to a function cooperation device, a virtual machine communication system, and a function cooperation method.

Background Art

Virtual patch panel technology is a technology for functionally cooperating virtual machines by dynamically connecting patches between physical network interface cards (NICs) and virtual machines in the housing. Non-Patent Literature 1 describes a virtual patch panel technology in which a specific transfer function occupies a dedicated CPU core to pass data between virtual machines.

CITATION LIST

Non Patent Literature

Non-Patent Literature 1: Yasufumi Ogawa, Tetsuro Nakamura, Naoki Takada, and Hiroyuki Nakamura, "Proposal and evaluation of soft patch panel for realizing fast and flexible connection between virtual machines", IEICE Technical Report, vol. 116, no. 322, NS2016-116, pp. 85-90, November 2016.

SUMMARY OF THE INVENTION

Technical Problem

In the virtual patch panel in the related art, packet loss occurs when a virtual machine is removed. Details of the packet loss will be described below with reference to FIG. 23 to FIG. 25.

FIG. 23 is a configuration diagram of a physical machine $9z$ in which the virtual patch panel technology is adopted. The physical machine $9z$ has virtual machines $11z$ and $12z$, transfer functions $21z$ to $23z$, and physical NICs $31z$ and $32z$.

Each of the physical NICs $31z$ and $32z$ is an interface that transmits and receives packets to and from the outside of the physical machine $9z$. Hereinafter, the physical NICs $31z$ and $32z$ are collectively referred to as a "physical NIC $30z$".

The virtual machines $11z$ and $12z$ are virtual calculators formed inside the physical machine $9z$. Hereinafter, the virtual machines $11z$ and $12z$ are collectively referred to as a "virtual machine $10z$".

The transfer functions $21z$ to $23z$ are functional units to transfer communication within the housing between the physical NIC $30z$ and the virtual machine $10z$ and communication within the housing between the plurality of virtual machines $10z$.

Hereinafter, the transfer functions $21z$ to $23z$ are collectively referred to as a "transfer function $20z$". Each transfer function $20z$ has an input interface (IF) that receives the input of the packet indicated by the ellipse "i" and an output IF that is the output destination of the packet indicated by the ellipse "o".

The patch controller $4z$ sets an input IF and an output IF to be used for transfer, for each transfer function $20z$. Thus, the patch between the physical NIC $30z$ and the virtual machine $10z$ and the patch between the plurality of virtual machines $10z$ can be freely changed. However, these IFs have the following assumptions:

The same transfer function $20z$ can simultaneously receive separate packets from a plurality of input IFs of the same transfer function $20zs$. However, respective input IFs in the plurality of transfer functions $20z$ cannot simultaneously receive packets from the same physical NIC $30z$.

The same transfer function $20z$ can simultaneously transmit separate packets from their plurality of output IFs. However, respective input IFs in the plurality of transfer functions $20z$ cannot simultaneously transmit packets to the same physical NIC $30z$.

FIG. 24 is a configuration diagram of when a path of traffic is configured for the physical machine $9z$ in FIG. 23. As indicated by the bold arrow, it is assumed that the path is configured in the order: "physical NIC $31z$→transfer function $21z$→virtual machine $11z$→transfer function $22z$→virtual machine $12z$→transfer function $23z$→physical NIC $32z$".

Along this path, the packet flows in ascending order of the number after P (in serial number). For example, it is assumed that the packet P2 is present in the transfer function $23z$ and the packets P3, P4 are present in the virtual machine $12z$.

FIG. 25 is a configuration diagram of when the virtual machine $12z$ is removed from the state illustrated in FIG. 24. It is assumed that a part of "virtual machine $12z$→transfer function $23z$" is removed from the path of FIG. 24, resulting in "physical NIC $31z$→transfer function $21z$→virtual machine $11z$→transfer function $22z$→physical NIC $32z$".

At this time, the queued packets P2, P3, and P4, which have been processed inside the virtual machine $12z$ and the transfer function $23z$, are lost without flowing through the physical NIC $32z$.

Thus, a main object of the present invention is to prevent the occurrence of packet loss when removing a virtual machine formed inside a physical machine.

Means for Solving the Problem

In order to solve the problem, the function cooperation device of the present invention has the following features.

The present invention provides a function cooperation device for controlling a physical machine that forms a virtual path for transferring a packet between a physical interface that transmits and receives a packet to and from an external network and a plurality of virtual machines built in the physical machine, the function cooperation device being configured to, when removal of a to-be-deleted node on the virtual path is detected, extract each of a node immediately before deletion located adjacently to and on an upstream side of the to-be-deleted node on the virtual path and a node immediately after deletion located adjacently to and on a downstream side of the to-be-deleted node,
form a bypass path for discharging a queued packet being processed by the to-be-deleted node to the node immediately after deletion, and a changed path excluding the to-be-deleted node from the virtual path, by making a connection so as to cause a transfer packet from the node immediately before deletion to flow to the node immediately after deletion, and
prioritize processing of discharging the queued packet to the node immediately after deletion on the bypass path over processing of transferring the transfer packet to the node immediately after deletion on the changed path.

This can prevent packet loss of the queued packet because the queued packet on the to-be-deleted node is discharged with priority from the bypass path to the node immediately after deletion.

The present invention provides a virtual machine communication system using a physical interface configured to transmit and receive a packet to and from an external network; a physical machine configured to transfer the packet to and from a plurality of virtual machines built in the physical machine via a transfer unit; and a function cooperation device configured to control the transfer unit in the physical machine, and the function cooperation device is configured to,
when removal of the virtual machine that is a to-be-deleted node is detected, extract each of a node immediately before deletion located on an upstream side of the to-be-deleted node and a node immediately after deletion located on a downstream side of the to-be-deleted node, a deletion input transfer unit configured to transfer a packet from the node immediately before deletion to the to-be-deleted node, and a deletion output transfer unit configured to transfer a packet from the to-be-deleted node to the node immediately after deletion;
the deletion output transfer unit is configured to switch a packet output destination from the node immediately after deletion to the deletion input transfer unit; and
the deletion input transfer unit is configured to switch the packet output destination from the to-be-deleted node to the node immediately after deletion,
store a packet input from the node immediately before deletion in a first input queue, and store a packet input from the deletion output transfer unit in a second input queue, and
switch an input queue from which the packet to be transferred to the node immediately after deletion is read so as to read the packet from the second input queue when the packet is present in the second input queue and read the packet from the first input queue when the packet is not present in the second input queue.

This can prevent packet loss of the queued packet because the queued packet on the to-be-deleted node temporarily enqueued in the second input queue is discharged with priority to the node immediately after deletion over the transfer packet enqueued in the first input queue.

In the present invention, the transfer unit is configured to transfer a packet in order of the physical interface on an input side, one or more of the virtual machines, the virtual machine of the to-be-deleted node, and the physical interface on an output side, and
the deletion input transfer unit is configured to switch the packet output destination from the virtual machine, which is the to-be-deleted node, to the physical interface on the output side, which is the node immediately after deletion.

Thus, in the configuration where the to-be-deleted node is located around the physical interface on the output side, even after the to-be-deleted node is removed, the packet can appropriately flow to the physical interface on the output side.

In the present invention, the transfer unit is configured to transfer a packet in order of the physical interface on an input side, one or more of the virtual machines, and the physical interface on an output side; and
the deletion input transfer unit is configured to switch the packet output destination from the virtual machine, which is the to-be-deleted node, to the virtual machine, which is the node immediately after deletion.

Thus, in the configuration where the to-be-deleted node is located at a location remote from the physical interface on the output side, even after the to-be-deleted node is removed, the packet can appropriately flow to the physical interface on the output side.

Effects of the Invention

According to the invention, the occurrence of packet loss can be prevented when the virtual machine formed inside the physical machine is removed.

DESCRIPTION OF EMBODIMENTS

An embodiment of the present invention will be described below with reference to the drawings.

Figure 1:
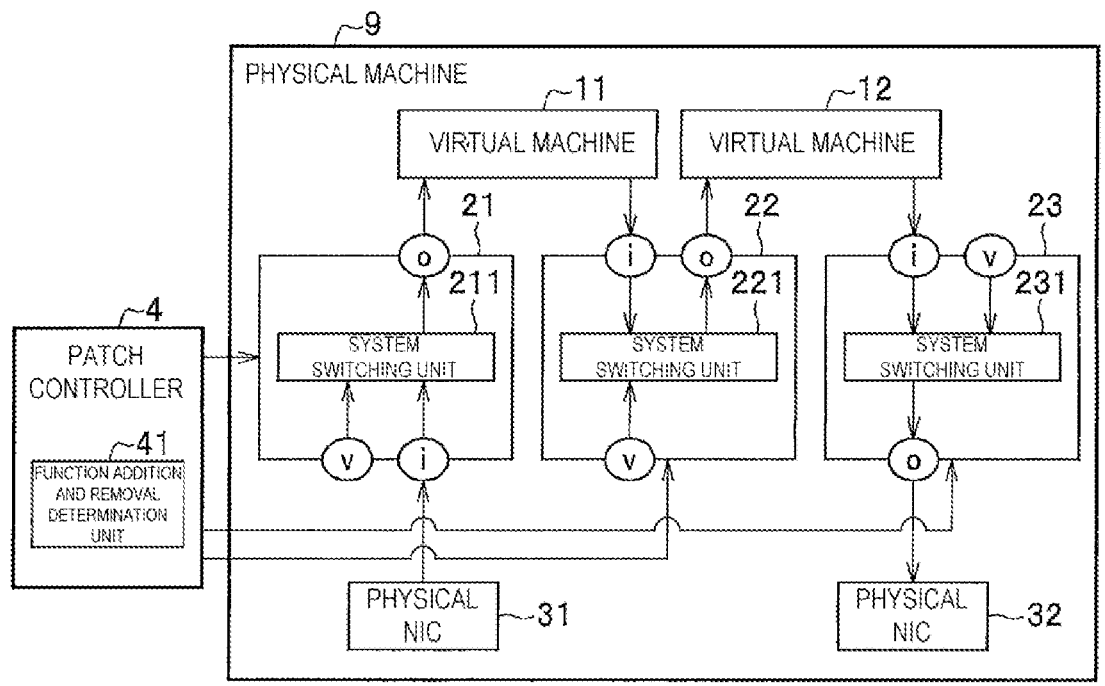
FIG. 1 is a configuration diagram of a virtual machine communication system employing virtual patch panel technology according to the present embodiment.

FIG. 1 is a configuration diagram of a virtual machine communication system employing virtual patch panel technology.

A physical machine 9 and a patch controller 4 that controls the physical machine 9, constituting the virtual machine communication system, are configured as computers having a central processing unit (CPU), a memory, storage means (storage unit) such as a hard disk, and a network interface.

The computer operates a control unit (control means) configured by each processing unit, by executing a program (also referred to as an application or an app which is an abbreviation thereof) loaded on the memory.

Figure 23:
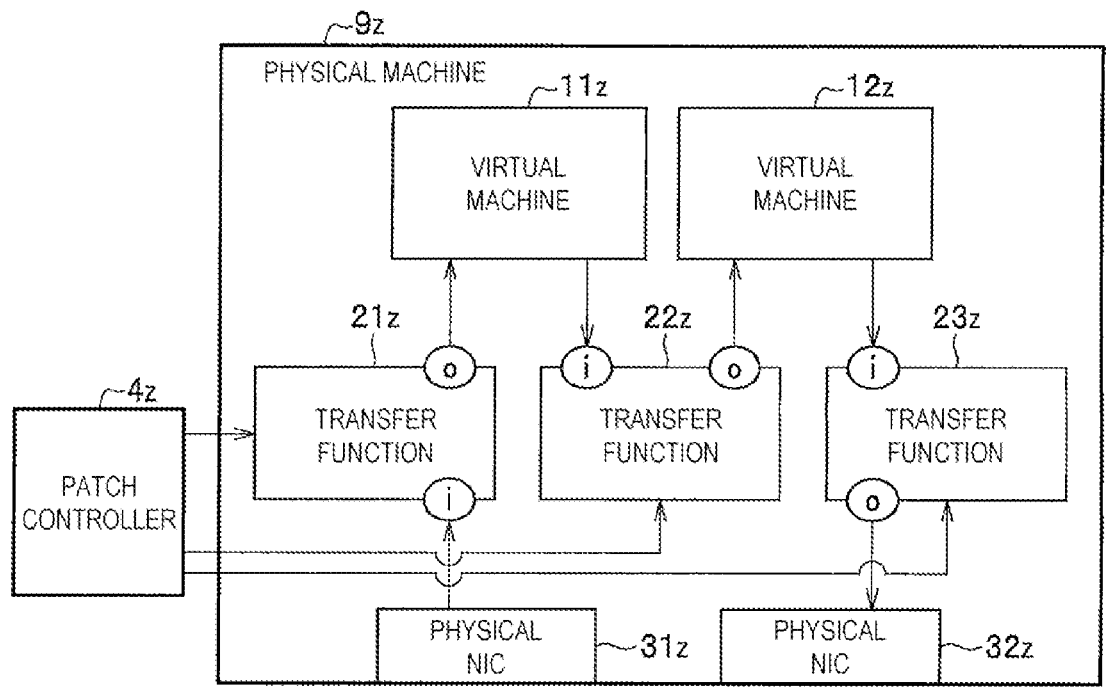
FIG. 23 is a configuration diagram of a physical machine employing the virtual patch panel technology.

The physical machine 9 of FIG. 1, similarly to the physical machine 9z of FIG. 23, has the following components:

Physical NICs 31, 32, which are interfaces for transmitting and receiving packets to and from an external part of the physical machine 9. Hereinafter, the physical NICs 31, 32 are collectively referred to as "physical NIC 30".

Virtual machines 11, 12 which are virtual calculators formed inside the physical machine 9. Hereinafter, the virtual machines 11, 12 are collectively referred to as a "virtual machine 10".

Transfer functions 21 to 23 which are functional units to transfer communication within a housing between the physical NIC 30 and the virtual machine 10 and communication within the housing between the plurality of virtual machines 10. Hereinafter, the transfer functions 21 to 23 are collectively referred to as a "transfer function 20". Each transfer function 20 has an input interface (IF) that receives the input of the packet indicated by the ellipse "i" and an output IF that is the output destination of the packet indicated by the ellipse "o".

A patch controller (function cooperation device) 4 configured to set an input IF and an output IF used for transfer for each transfer function 20.

On the other hand, the physical machine 9 of FIG. 1 has the following components added to the physical machine 9z of FIG. 23:

A redundant IF (indicated by the ellipse "v") that receives the input of the packet, in addition to the input IF, for each transfer function 20.

System switching units 211, 221, and 231 (hereinafter referred to collectively as "system switching unit 200") that switch the IF for receiving (pruning) the input of the packets between the input IF and the redundant IF, for each transfer function 20.

Function addition and removal determination unit 41 which is configured to control each transfer function 20 so as to form a communication path (bypass path) for preventing packet loss during removal of the virtual machine 10, while detecting addition and removal of the virtual machine 10, for the patch controller 4.

Figure 2:
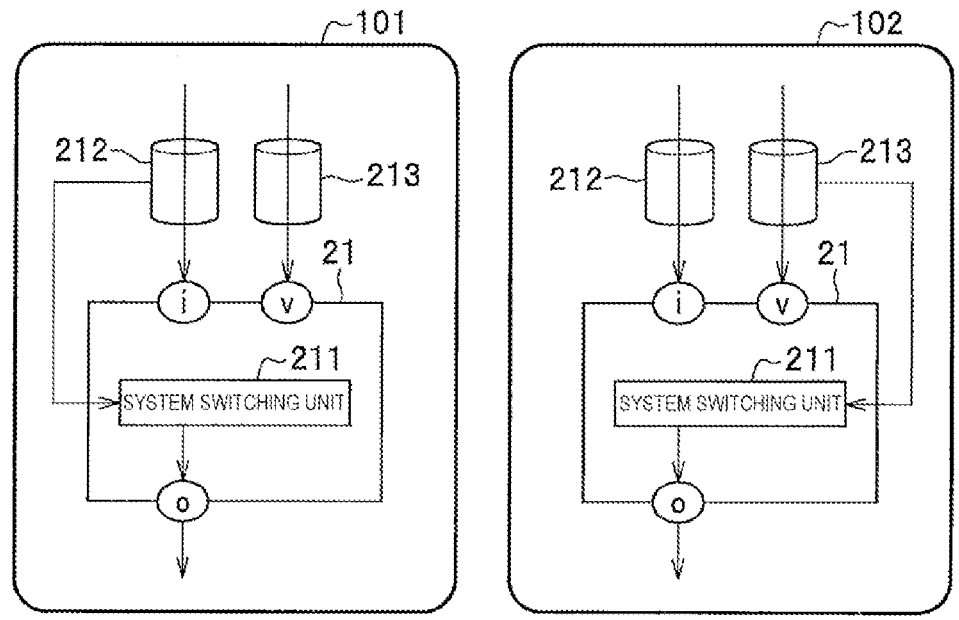
FIG. 2 is a configuration diagram illustrating details of the transfer function of FIG. 1 according to the present embodiment.

FIG. 2 is a configuration diagram illustrating details of the transfer function 21 of FIG. 1.

Reference numeral 101 denotes a normal communication path of packets when switching is not performed by the system switching unit 211 (switching is off). The packets input from the input IF are stored sequentially in an input queue 212 (first input queue) of the input IF. The system switching unit 211 configures the communication path of packets so as to prune the packets from the input queue 212 and transfer the packets to the output IF. Reference numeral 102 denotes a communication path of packets when the virtual machine 10 for which switching is performed by the system switching unit 211 (switching is on) is removed. The packets input from the redundant IF are stored sequentially in the redundant queue 213 (second input queue) of the redundant IF. The system switching unit 211 configures the communication path of the packet so as to prune packets from the redundant queue 213 and transfer the packets to the output IF.

Hereinafter, with reference to FIG. 3 to FIG. 8, a communication path (bypass path) configured by the patch controller 4 when the virtual machine 10 is removed is described. For this description, the following terms are defined in this specification. A "virtual path" is a communication path through which a packet is received by the physical machine 9, passes through the housing of the physical machine 9, and is transmitted from the physical machine 9. Note that one logical path is formed by sequentially connecting communication paths (patches) between adjacent IFs by employing, for example, virtual patch panel technology. The state of the virtual path is a normal path, a bypass path, and a changed path.

The "normal path" is a normal state of a path (before addition or removal of the virtual machine 10).

The "bypass path" is a path that is temporarily formed in order to prioritize discharge of the queued packets during the removal of the virtual machine 10. Note that the bypass path is not used during the addition of the virtual machine 10.

The "changed path" refers to the state of the path after changing the virtual machine 10 (after addition or removal).

"Node" is a point on the network that constitutes the path within the physical machine 9, and is the virtual machine 10 or the physical NIC 30. In focusing on the removal process of the virtual machine 10, a to-be-deleted node, a node immediately before deletion, and a node immediately after deletion are defined.

The "to-be-deleted node" is the virtual machine 12 determined to be removed by the function addition and removal determination unit 41.

The "node immediately before deletion" is a node located immediately upstream of (immediately before) the normal path when viewed from the to-be-deleted node. That is, one transfer function 20 relays between the to-be-deleted node and the node immediately before deletion.

The "node immediately after deletion" is a node located immediately downstream (immediately after) of the normal path when viewed from the to-be-deleted node. That is, one transfer function 20 relays between the to-be-deleted node and the node immediately after deletion.

The transfer function 20 (transfer unit) transfers the packet between the connected nodes. Note that the transfer function 20 directly connected to the to-be-deleted node is defined as an instruction target from the function addition and removal determination unit 41 as follows.

The "deletion input transfer function (deletion input transfer unit)" is a transfer function 20 for inputting a packet into a to-be-deleted node. That is, the deletion input transfer function transfers the packet from the node immediately before deletion to the to-be-deleted node.

The "deletion output transfer function (deletion output transfer unit)" is a transfer function 20 to which the to-be-deleted node outputs the packet. That is, the deletion output transfer function transfers the packet from the to-be-deleted node to the node immediately after deletion.

Figure 3:
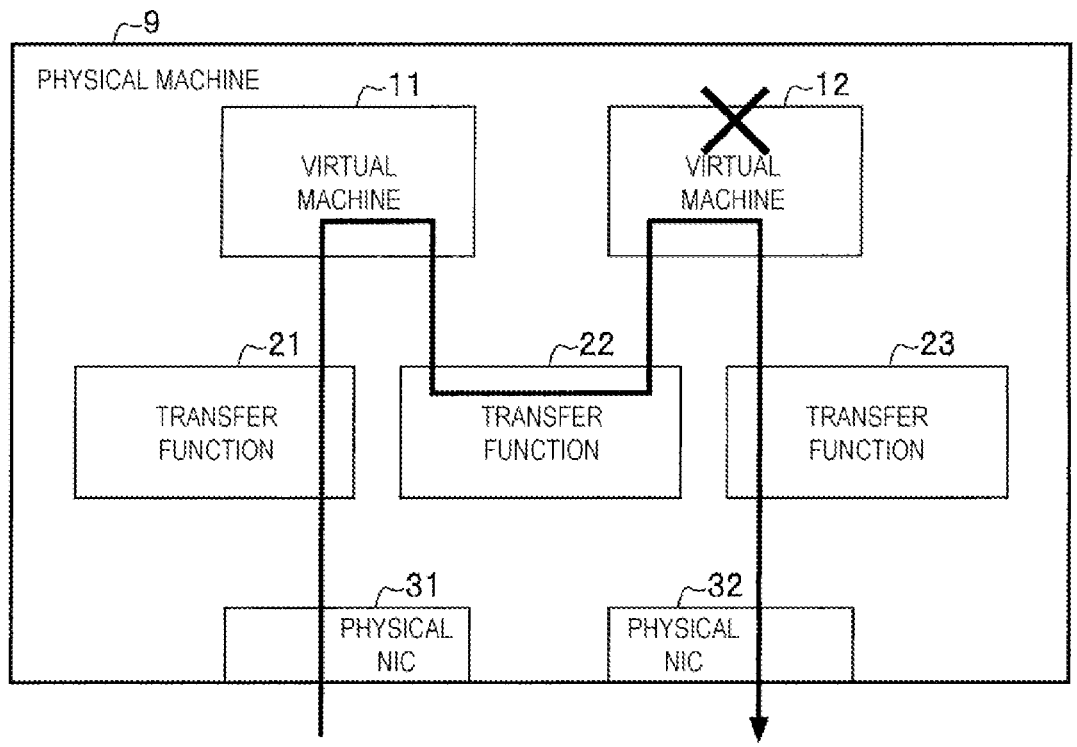
FIG. 3 is an example of a configuration before deletion when a to-be-deleted node is present on an end point side of a normal path according to the present embodiment.
Figure 4:
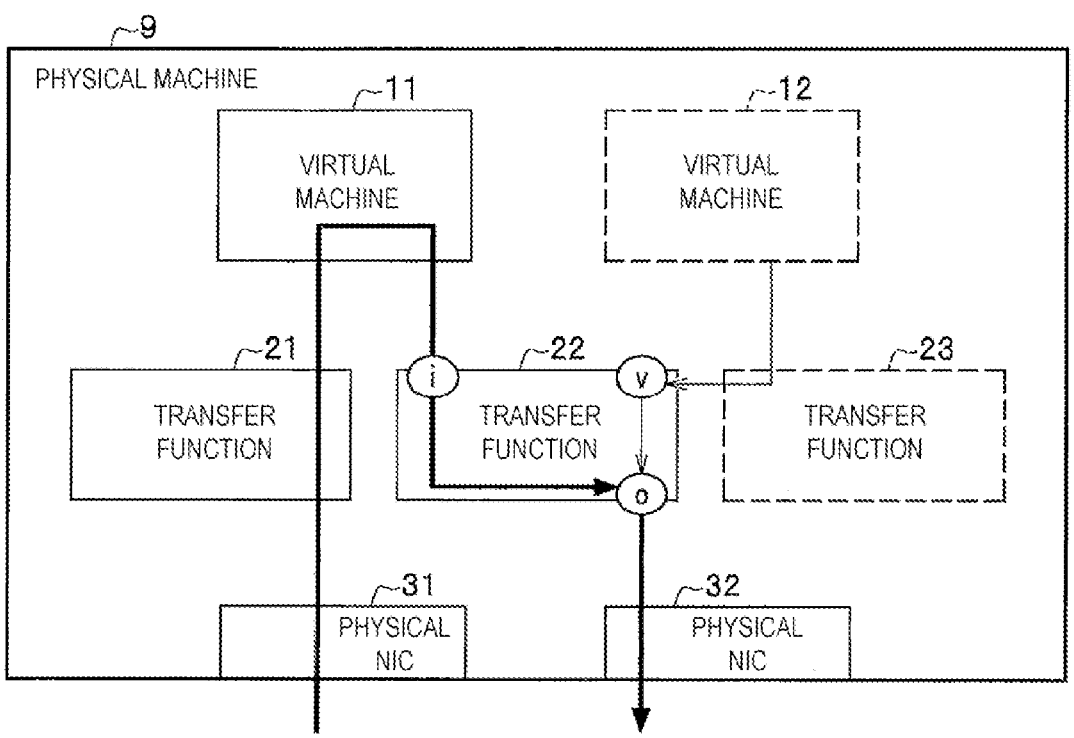
FIG. 4 is an example of a configuration after deletion when the to-be-deleted node is present on the end point side of the normal path according to the present embodiment.

FIG. 3 and FIG. 4 are examples of a configuration in which the to-be-deleted node is present on the end point side of the normal path. When this configuration example is applied to the defined terms, it is as follows.

The "to-be-deleted node" is the virtual machine 12 indicated by the x mark in FIG. 3, the "node immediately before deletion" is the virtual machine 11, and the "node immediately after deletion" is the physical NIC 32.

The "deletion input transfer function" is the transfer function 22, and the "deletion output transfer function" is the transfer function 23.

The "normal path" is a path formed in the order of "physical NIC 31→virtual machine 11→virtual machine 12→physical NIC 32", which is described by the bold arrow in FIG. 3.

The "bypass path" is a path formed in the order of "virtual machine 12→transfer function 23→transfer function 22", which is described by the fine arrow in FIG. 4.

The "changed path" is a path formed in the order of "physical NIC 31→virtual machine 11→physical NIC 32", which is described by the bold arrow in FIG. 4.

Figure 5:
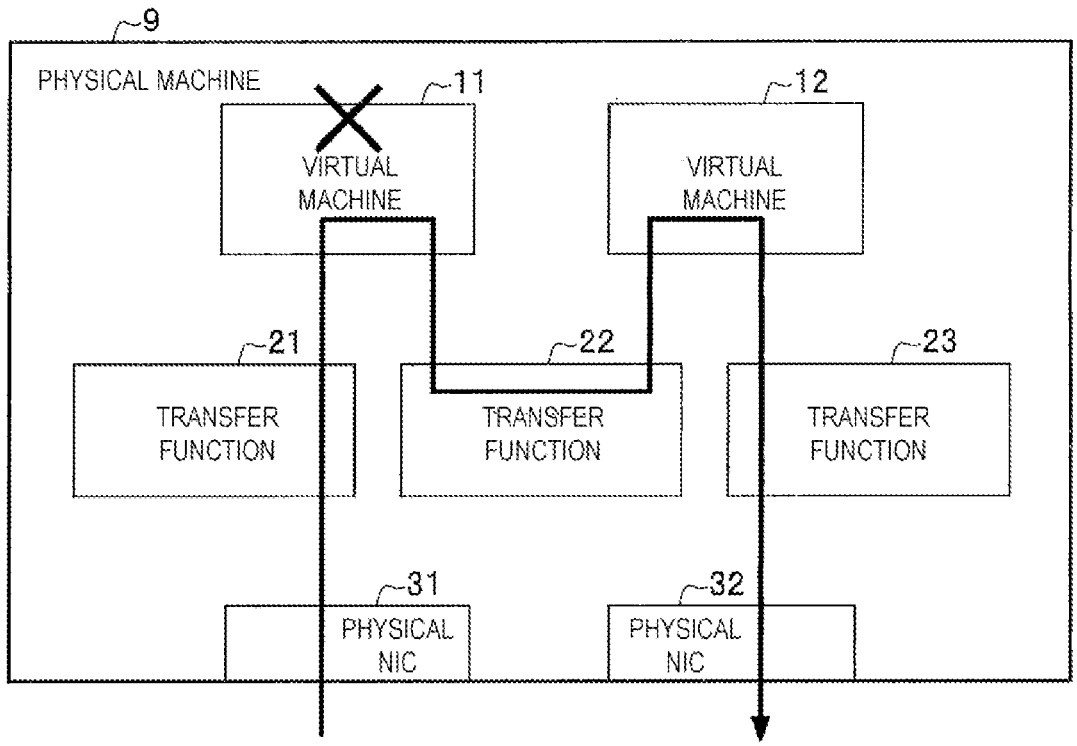
FIG. 5 is an example of a configuration before deletion when the to-be-deleted node is present on a start point side of the normal path according to the present embodiment.
Figure 6:
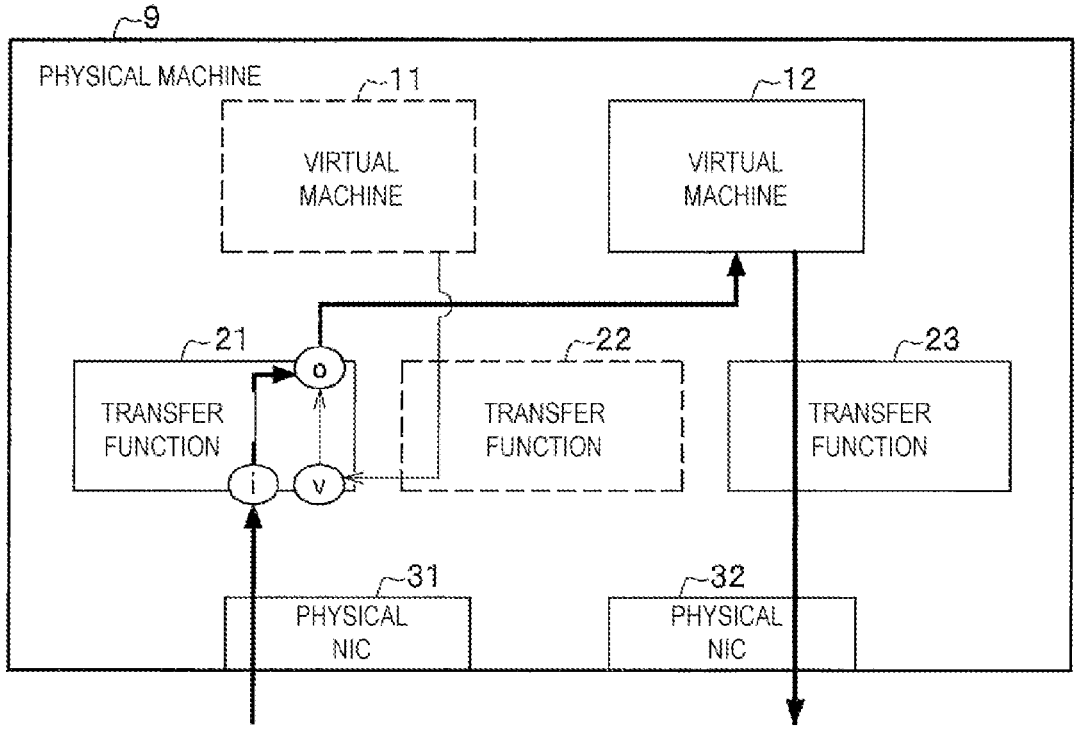
FIG. 6 is an example of a configuration after deletion when the to-be-deleted node is present on the start point side of the normal path according to the present embodiment.

FIG. 5 and FIG. 6 are examples of a configuration in which the to-be-deleted node is present on the start point side of the normal path. When this configuration example is applied to the defined terms, it is as follows.

The "to-be-deleted node" is the virtual machine 11 indicated by the x mark in FIG. 5, the "node immediately before deletion" is the physical NIC 31, and the "node immediately after deletion" is the virtual machine 12.

The "deletion input transfer function" is the transfer function 21, and the "deletion output transfer function" is the transfer function 22.

The "normal path" is a path formed in the order of "physical NIC 31→virtual machine 11→virtual machine 12→physical NIC 32", which is described by the bold arrow in FIG. 5.

The "bypass path" is a path formed in the order of "virtual machine 11→transfer function 22→transfer function 21", which is described by the fine arrow in FIG. 6.

The "changed path" is a path formed in the order of "physical NIC 31→virtual machine 12→physical NIC 32", which is described by the bold arrow in FIG. 6.

Figure 7:
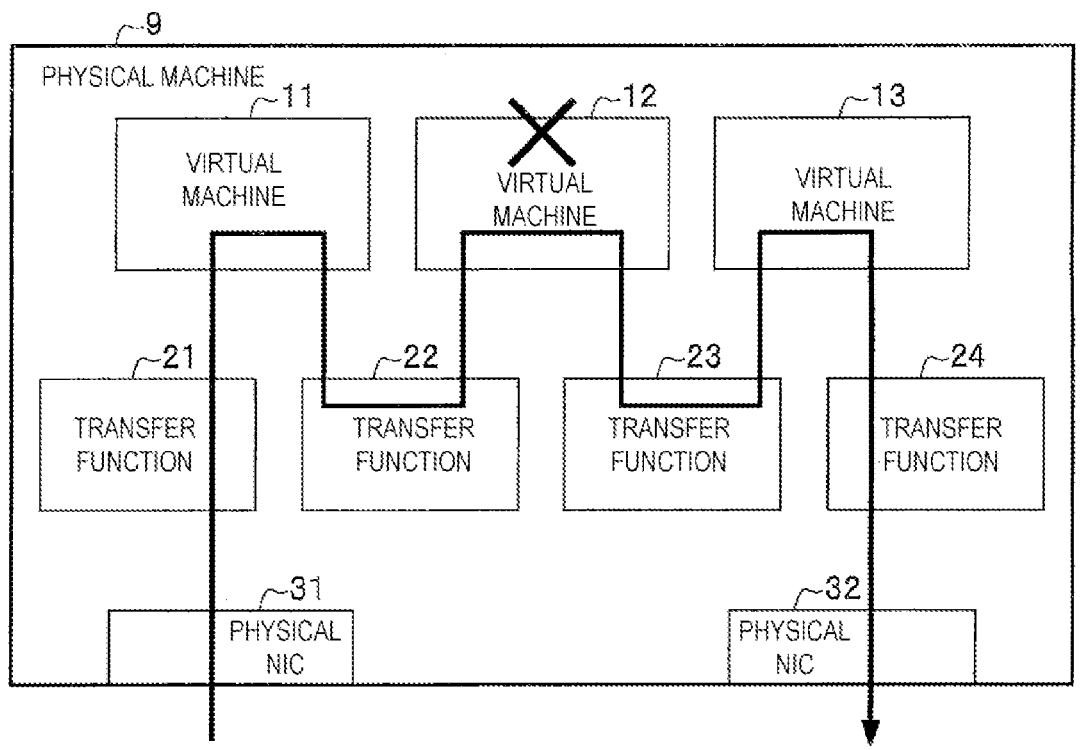
FIG. 7 is an example of a configuration before deletion when the to-be-deleted node is present on a midway side of the normal path according to the present embodiment.
Figure 8:
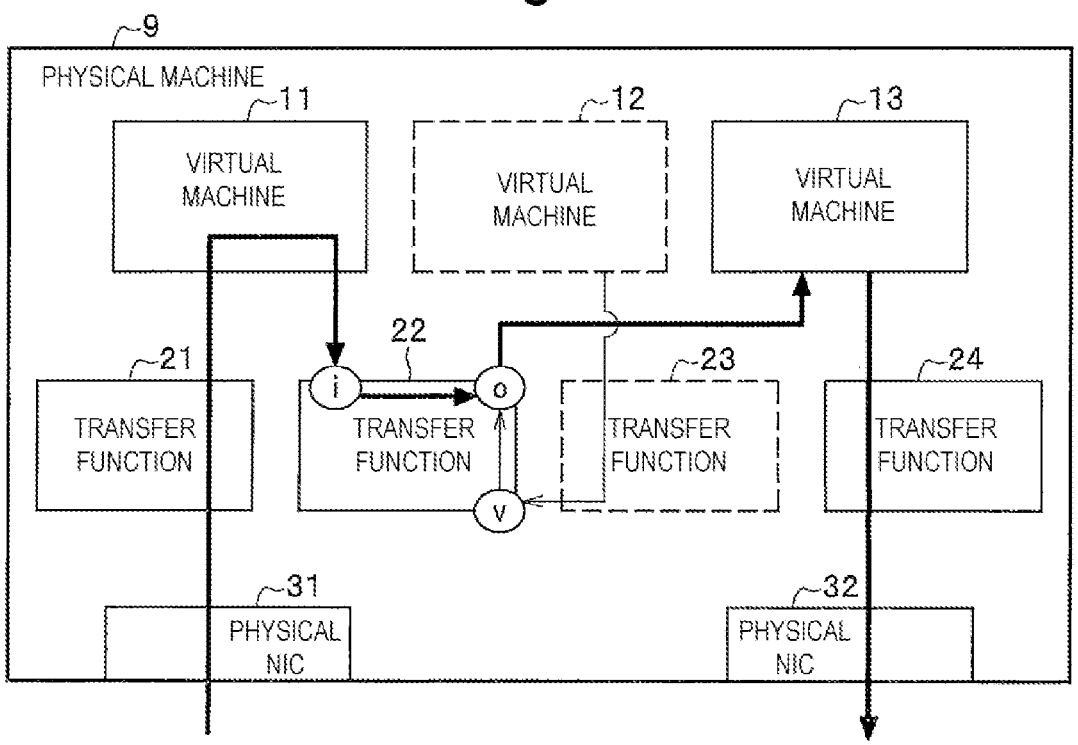
FIG. 8 is an example of a configuration after deletion when the to-be-deleted node is present on the midway side of the normal path according to the present embodiment.

FIG. 7 and FIG. 8 are examples of a configuration in which the to-be-deleted node is present on the midway side of the normal path. When this configuration example is applied to the defined terms, it is as follows.

The "to-be-deleted node" is the virtual machine 12 indicated by the x mark in FIG. 7, the "node immediately before deletion" is the virtual machine 11, and the "node immediately after deletion" is the virtual machine 13.

The "deletion input transfer function" is the transfer function 22, and the "deletion output transfer function" is the transfer function 23.

The "normal path" is a path formed in the order of "physical NIC 31→virtual machine 11→virtual machine 12→virtual machine 13→physical NIC 32", which is described by the bold arrow in FIG. 7.

The "bypass path" is a path formed in the order of "virtual machine 12→transfer function 23→transfer function 22" described by the fine arrow in FIG. 8.

The "changed path" is a path formed in the order of "physical NIC 31→virtual machine 11→virtual machine 13→physical NIC 32", which is described by the bold arrow in FIG. 8.

In three variations (end point side, start point side, and midway side) of the position of the to-be-deleted node in the normal path described above, the following path switching process of (Procedure 1) to (Procedure 5) instructed by the patch controller 4 can be used in common.

(Procedure 1) The function addition and removal determination unit 41 detects the to-be-deleted node from the normal path "node immediately before deletion→deletion input transfer function→to-be-deleted node→deletion output transfer function→node immediately after deletion". Then, the function addition and removal determination unit 41 extracts the node immediately before deletion, the deletion input transfer function, the to-be-deleted node, the deletion output transfer function, and the node immediately after deletion.

(Procedure 2) The function addition and removal determination unit 41 transmits the first removal instruction to the deletion output transfer function. In accordance with the first removal instruction, the deletion output transfer function changes a part of the normal path to a bypass path "to-be-deleted node→deletion output transfer function→deletion input transfer function." That is, the system switching unit 200 of the deletion output transfer function switches its own output from the normal path (node immediately after deletion) to the bypass path (redundant IF of the deletion input transfer function).

(Procedure 3) The function addition and removal determination unit 41 transmits the second removal instruction to the deletion input transfer function. In accordance with the second removal instruction, the deletion input transfer function is changed to the changed path of "node immediately before deletion→deletion input transfer function→node immediately after deletion" by detaching the to-be-deleted node from the normal path. In this state, the deletion input transfer function has the input from the bypass path and the input from the changed path.

(Procedure 4) The deletion input transfer function causes the queued packets in the bypass path to flow to the output side of the changed path with priority over the transfer packet input from the node immediately before deletion in accordance with the second removal instruction. That is, when the queued packets input from the bypass path are present in the queue of the redundant IF (redundant queue 213 in FIG. 2), the queued packets are pruned from the bypass path "to-be-deleted node→the deletion output transfer function→the deletion input transfer function", and are transferred to the output side of the changed path (node immediately after deletion). This allows the queued packets to be properly bypassed via the redundant IF, so packet loss during the removal of the virtual machine can be prevented.

(Procedure 5) After the queued packets from the bypass path disappear from the redundant IF queue, the deletion input transfer function validates the changed path, so that the transfer packets enqueued in the queue of the input IF (input queue 212 in FIG. 2) from the node immediately before deletion are pruned and transferred to the node immediately after deletion. Further, the bypass path that has finished its role due to the absence of the queued packets in the bypass path may be deleted. That is, the deletion output transfer function is stopped and the to-be-deleted node is deleted.

Hereinafter, the details of the case where the path switching process illustrated in (Procedure 1) to (Procedure 5) is applied to the case where the to-be-deleted node is present on the end point side of the normal path (FIG. 3 and FIG. 4) will be described. First, the function addition and removal determination unit 41 extracts the transfer function 22 immediately before the to-be-deleted node denoted by an x mark (=virtual machine 12) and the transfer function 23 immediately after the virtual machine 12 from the normal path "physical NIC 31→virtual machine 11→virtual machine 12→physical NIC 32" in FIG. 3 (Procedure 1).

Figure 9:
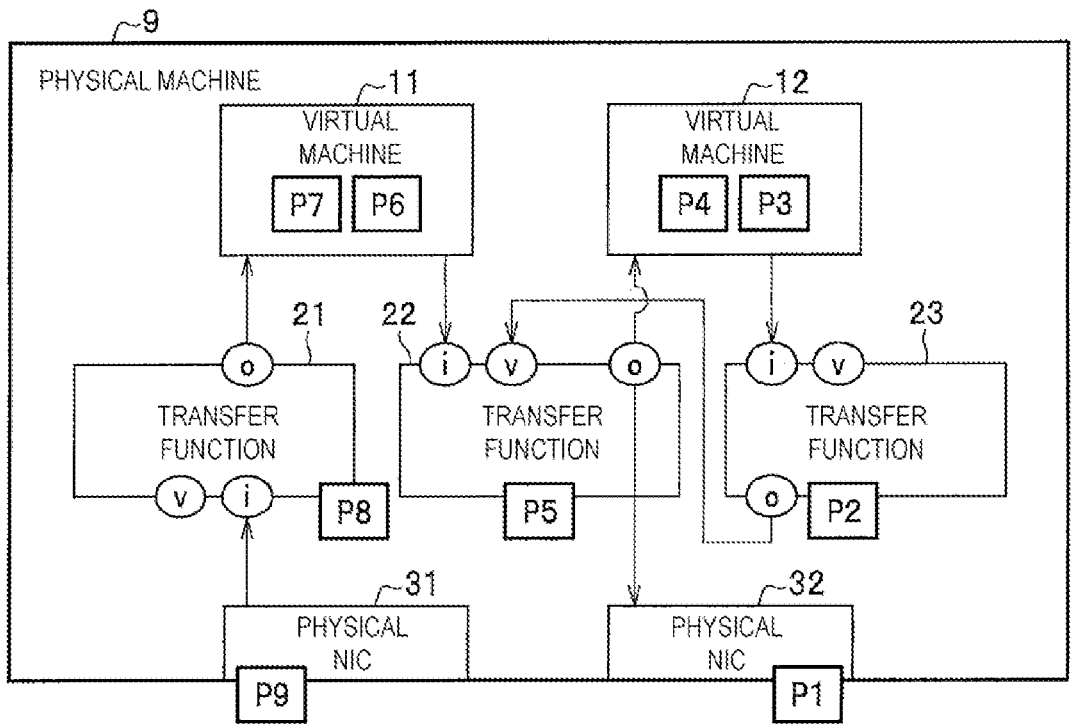
FIG. 9 is an example of a configuration illustrating a state of a first step in which the virtual machine incorporated into the path is removed according to the present embodiment.
Figure 10:
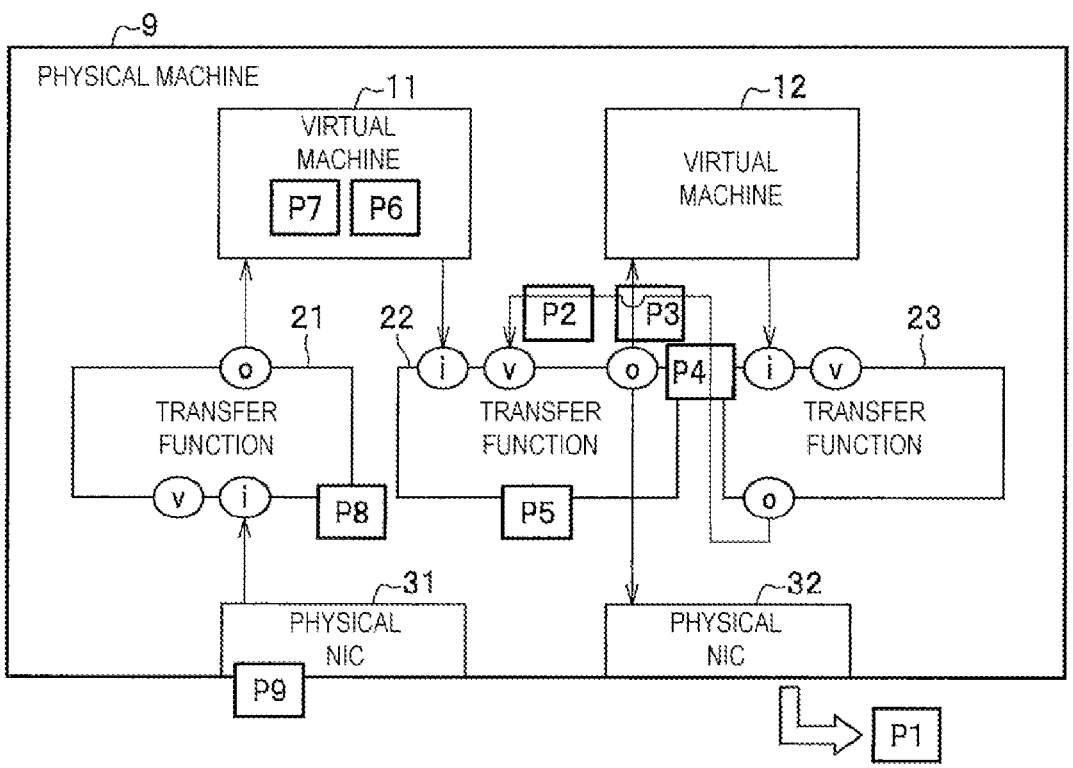
FIG. 10 is an example of a configuration illustrating a state of a second step in which the virtual machine incorporated into the path is removed according to the present embodiment.

In FIG. 9, a system switching unit 231 in the transfer function 23 changes the output destination of the transfer function 23 from the physical NIC 32 to the redundant IF of the transfer function 22 (Procedure 2). This causes the queued packet P2 in the transfer function 23 and the queued packets P3, P4 in the virtual machine 12 to be sequentially enqueued in the queue of the redundant IF (FIG. 10).

Figure 11:
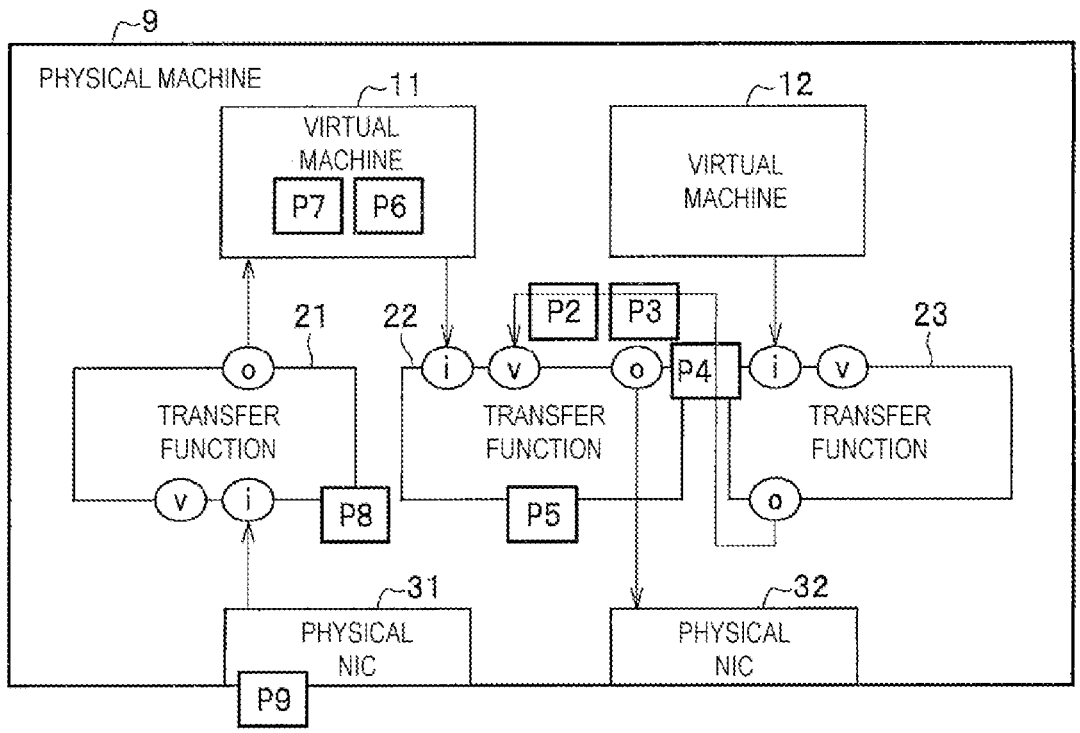
FIG. 11 is an example of a configuration illustrating a state of a third step in which the virtual machine incorporated into the path is removed according to the present embodiment.
Figure 12:
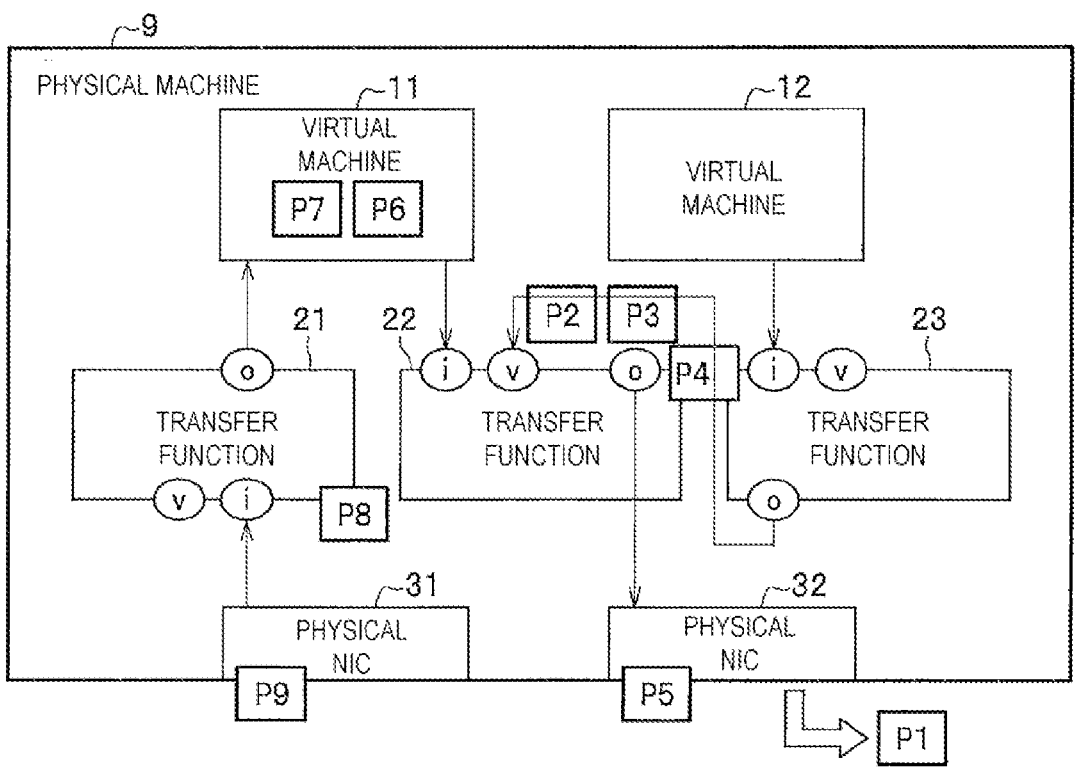
FIG. 12 is an example of a configuration illustrating a state of a fourth step in which the virtual machine incorporated into the path is removed according to the present embodiment.
Figure 13:
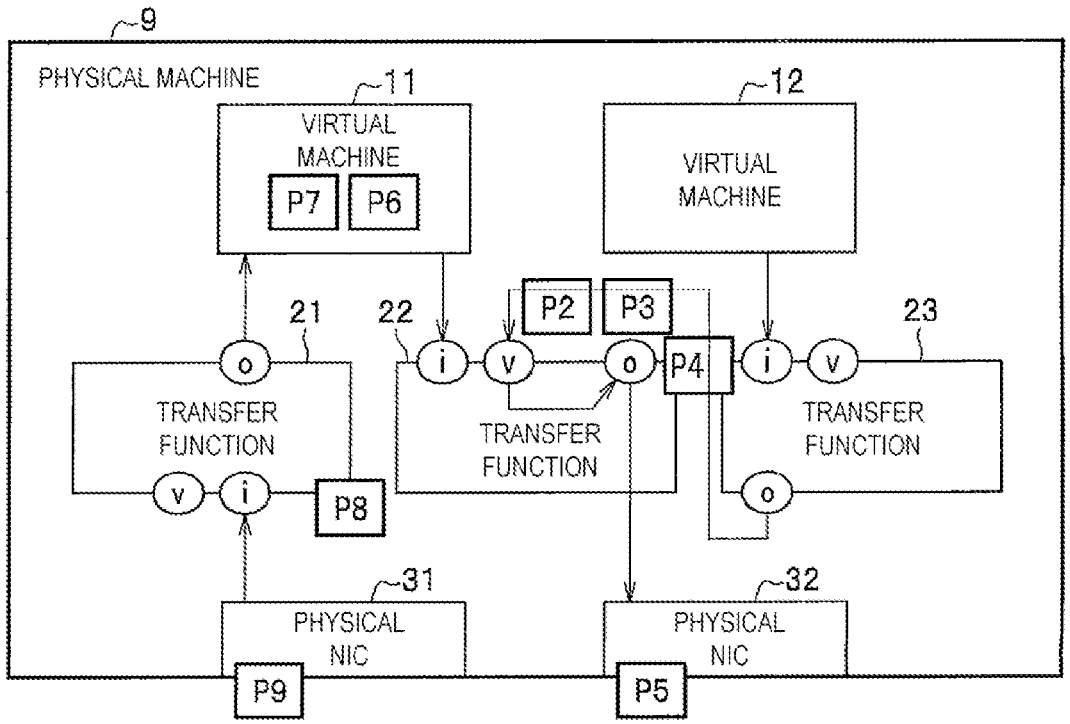
FIG. 13 is an example of a configuration illustrating a state of a fifth step in which the virtual machine incorporated into the path is removed according to the present embodiment.
Figure 14:
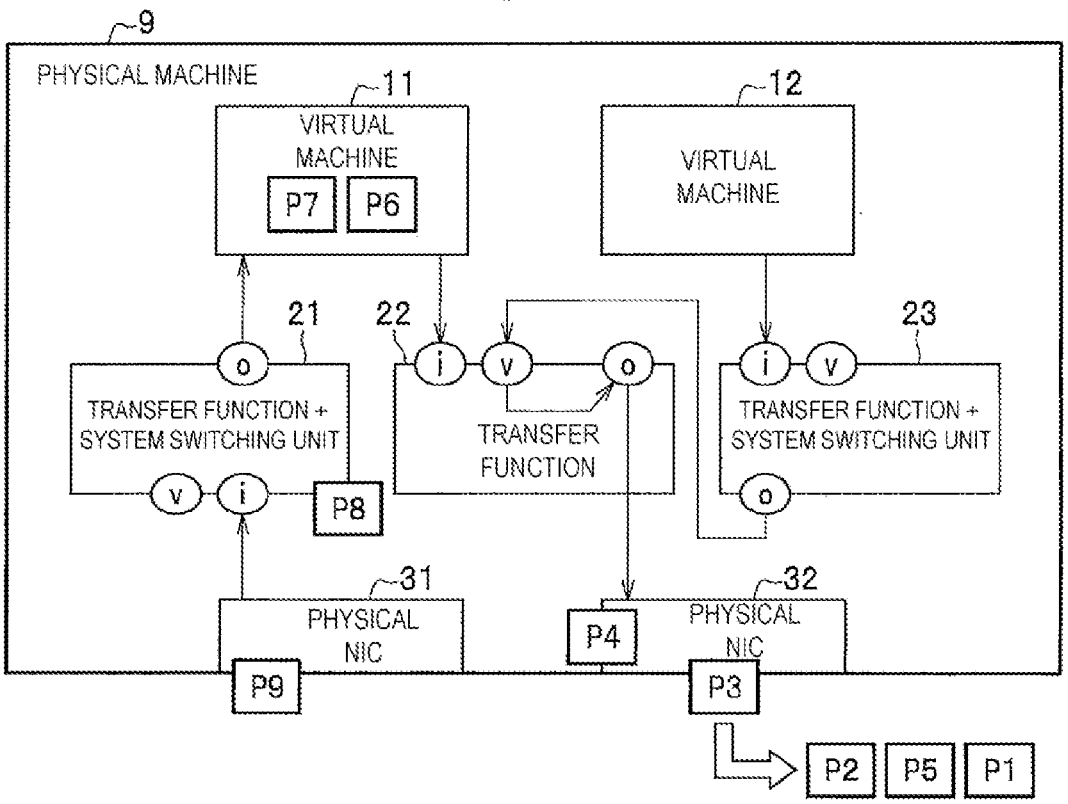
FIG. 14 is an example of a configuration illustrating a state of a sixth step in which the virtual machine incorporated into the path is removed according to the present embodiment.

In FIG. 11, the system switching unit 221 in the transfer function 22 changes the output IF of the transfer function 22 from the virtual machine 12 to the physical NIC 32 (Procedure 3). Thus the transfer packet P5 in the transfer function 22 does not flow into the virtual machine 12 and is transferred out of the physical NIC 32 during the removal (FIG. 12). In FIG. 13, the system switching unit 221 in the transfer function 22 turns on switching by changing the source of the packet the transfer function 22 prunes from the input IF to the redundant IF (Procedure 4). Thus, the queued packets P2, P3, P4 in the queue of the redundant IF of the transfer function 22 are transferred out of the physical NIC 32 (FIG. 14).

Figure 15:
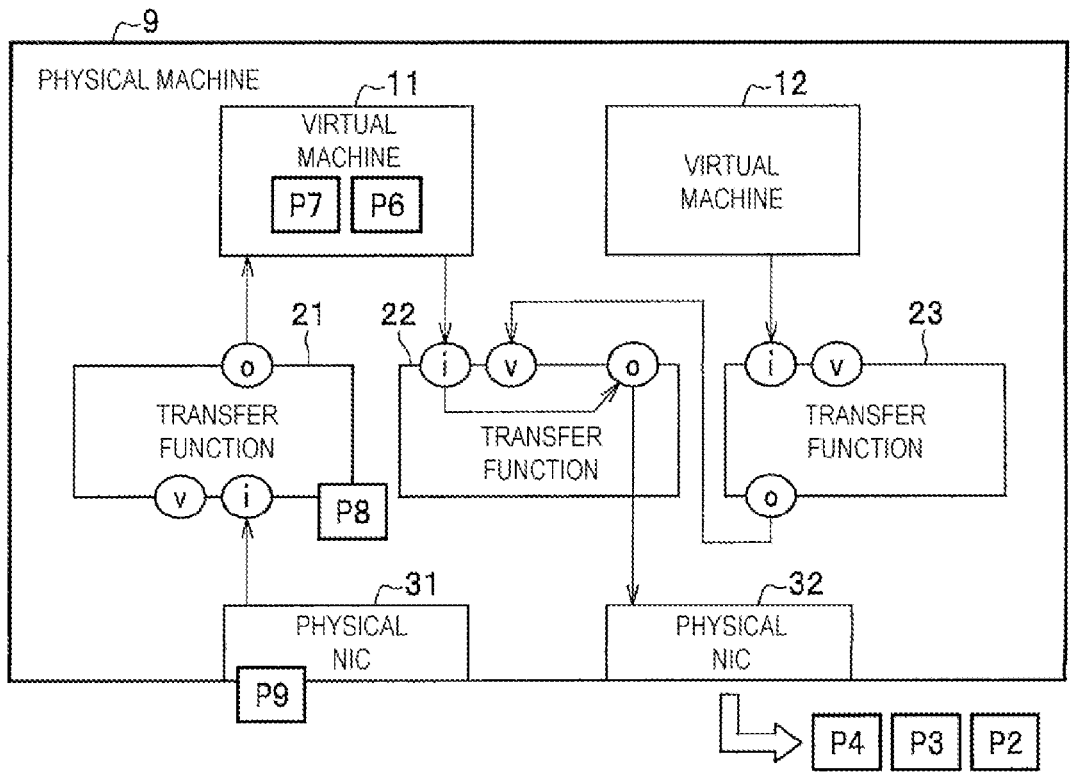
FIG. 15 is an example of a configuration illustrating a state of a seventh step in which the virtual machine incorporated into the path is removed according to the present embodiment.
Figure 16:
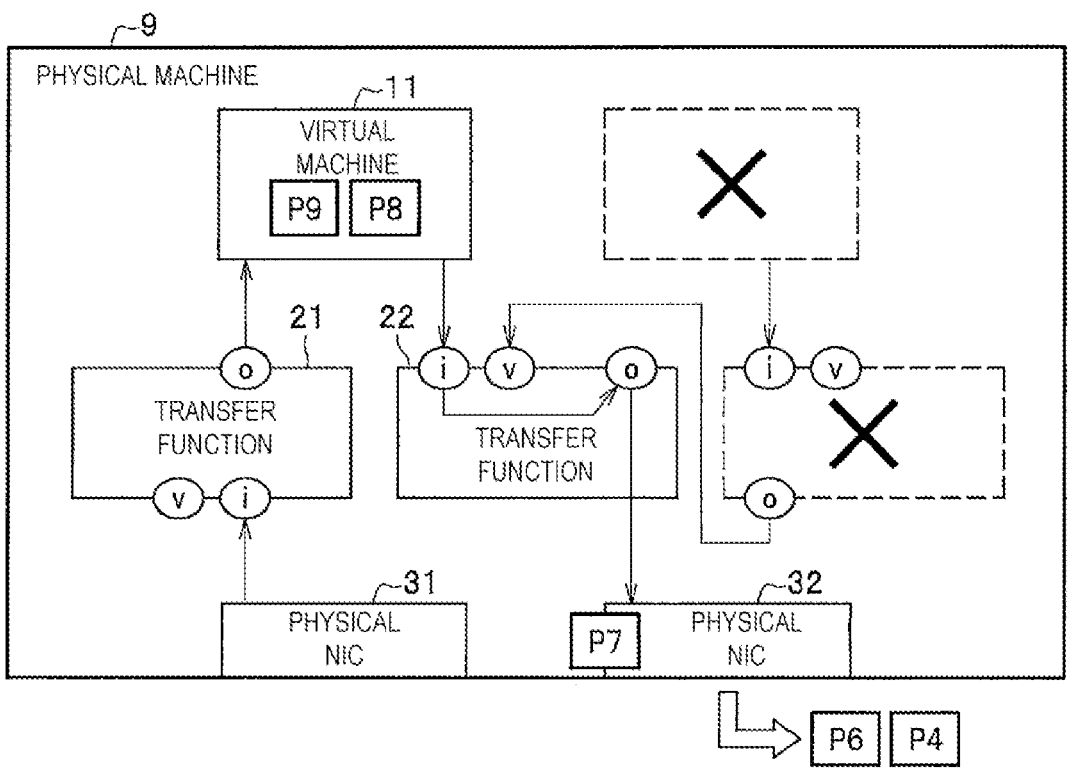
FIG. 16 is an example of a configuration illustrating a state of an eighth step in which the virtual machine incorporated into the path is removed according to the present embodiment.

In FIG. 15, the system switching unit 221 in the transfer function 22 turns off switching by changing the source of the packets the transfer function 22 prunes from the redundant IF, wait queue of which is 0, to the input IF (Procedure 5). Thus, the subsequent transfer packets P6, P7, P8, P9 input via the input IF of the transfer function 22 are transferred out of the physical NIC 32 (FIG. 16).

The patch controller 4 receives a notification (notification that switching is off) from the transfer function 22 that the pruning from its own input IF is resumed, and stops the transfer function 23 that is outside of the range of the path of the traffic and is no longer used. Further, the virtual machine 12 is manually stopped by the user, for example.

As described above, by providing a bypass path around the to-be-deleted node and appropriately discharging the queued packets from the bypass path, packet loss around the to-be-deleted node can be prevented. On the other hand, from FIG. 17, details of the addition process of the virtual machine will be described.

Figure 17:
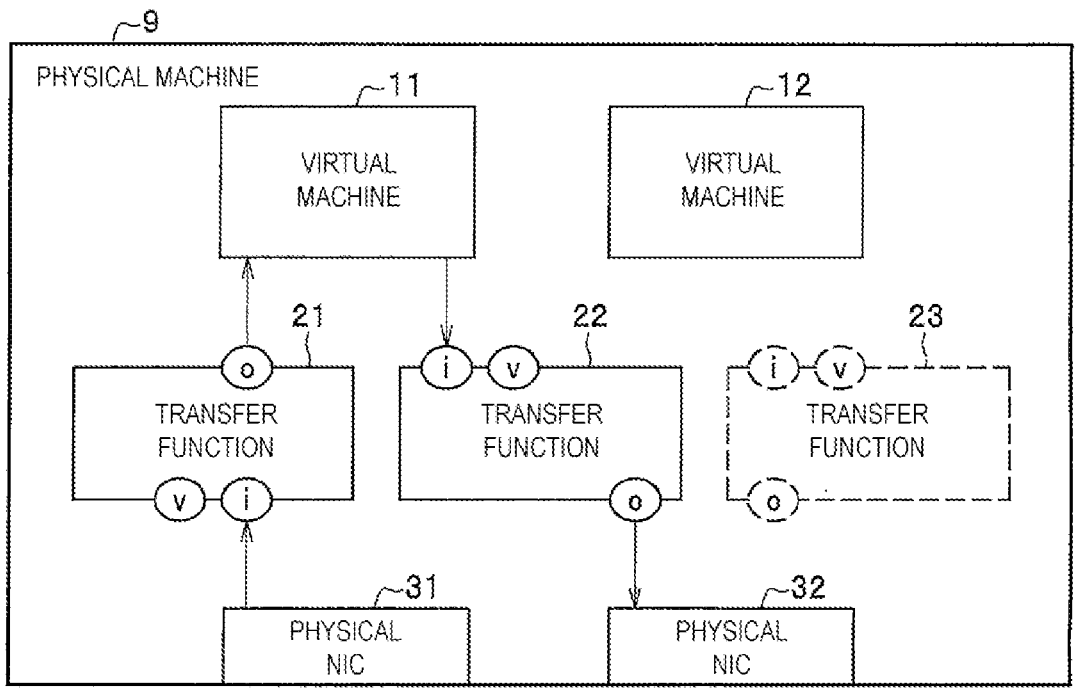
FIG. 17 is an example of a configuration illustrating a state of a first step in which an added virtual machine is incorporated into a path according to the present embodiment.
Figure 18:
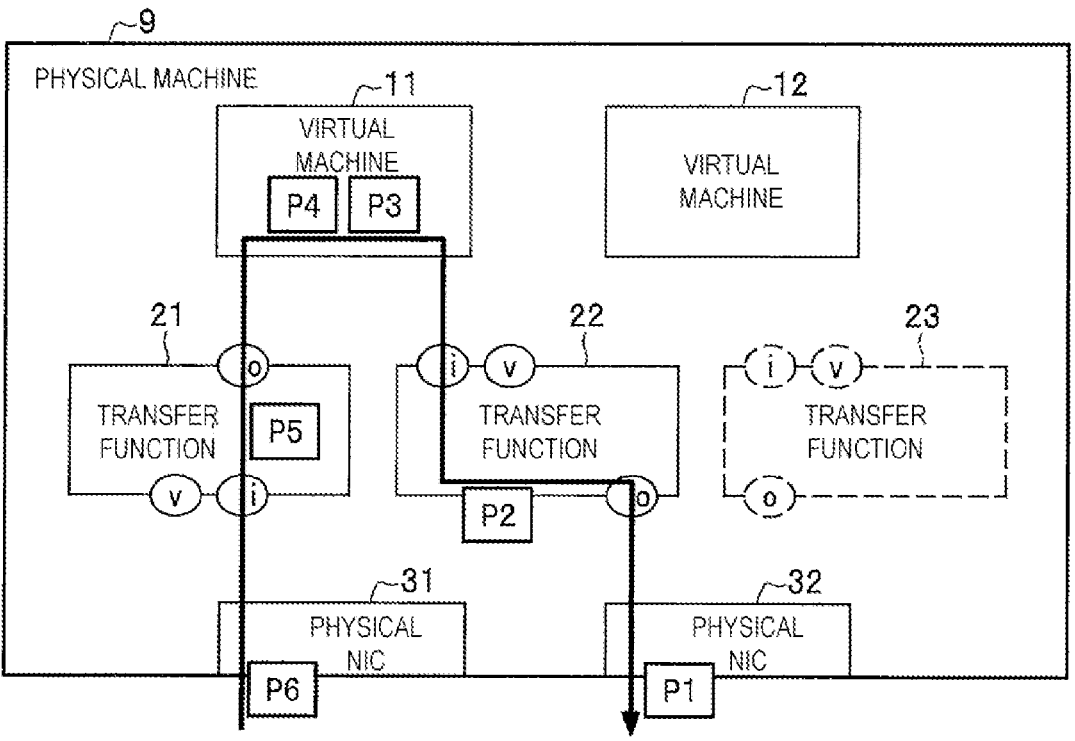
FIG. 18 is an example of a configuration illustrating a state of a second step in which the added virtual machine is incorporated into the path according to the present embodiment.
Figure 24:
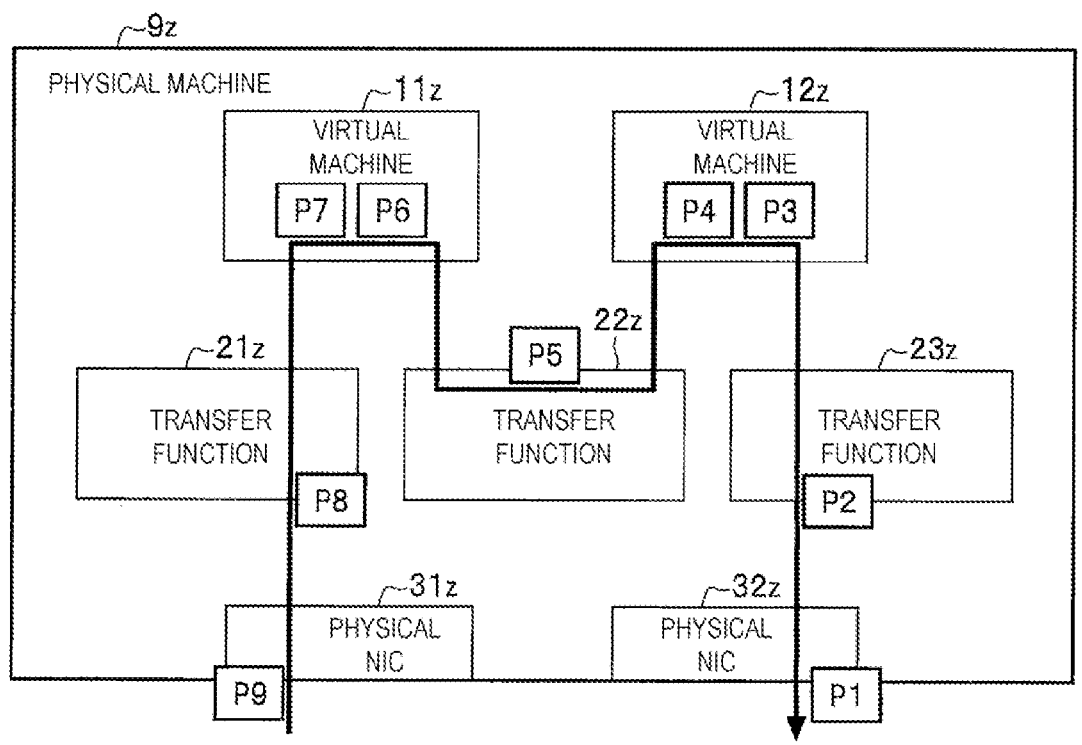
FIG. 24 is a configuration diagram when a path of traffic is configured for the physical machine of FIG. 23.
Figure 25:
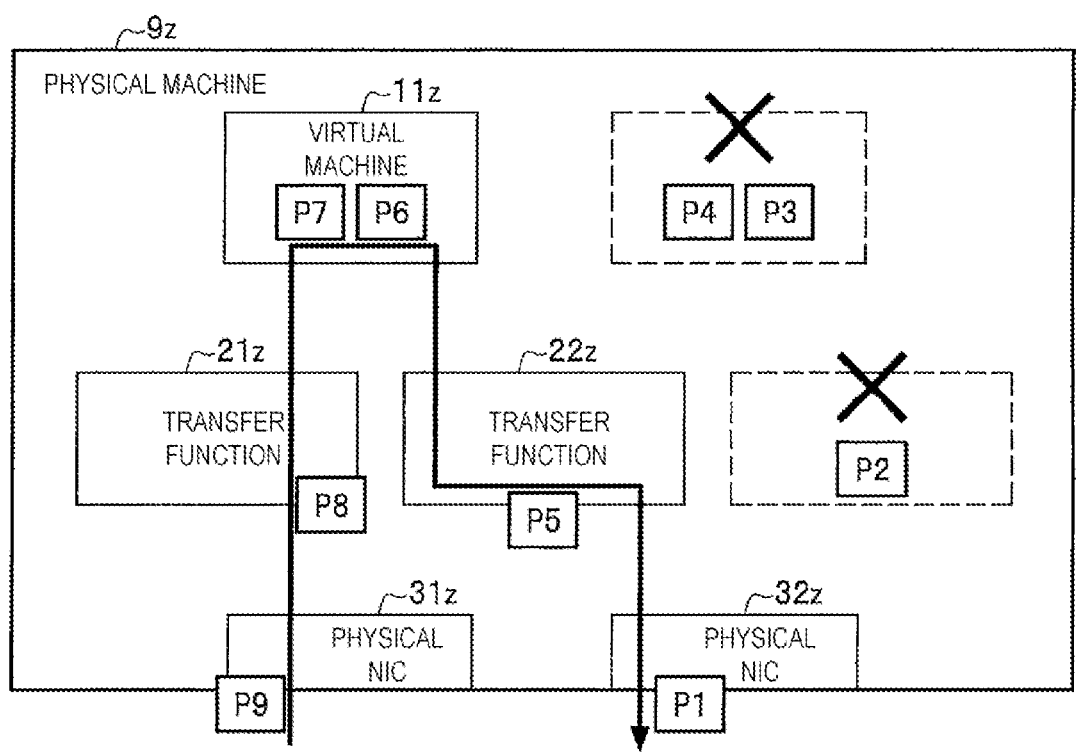
FIG. 25 is a configuration diagram when the virtual machine is removed from the state illustrated in FIG. 24.

FIG. 17 illustrates a state immediately after the virtual machine 12 is manually added by the user. Since the virtual machine 12 is not able to communicate with other nodes in this state, it needs to be incorporated into the normal path. The patch controller 4 receives an instruction from an administrator or the like to change the path from the normal path "physical NIC 31→virtual machine 11→physical NIC 32" in FIG. 18 to the changed path "physical NIC 31→virtual machine 11→virtual machine 12→physical NIC 32" in FIG. 24, by the addition of the virtual machine 12. The patch controller 4 transmits a first addition instruction to the transfer function 22 located immediately before the virtual machine 12 on the normal path, and transmits a second addition instruction to the transfer function 23 located immediately after the virtual machine 12 on the normal path.

Figure 19:
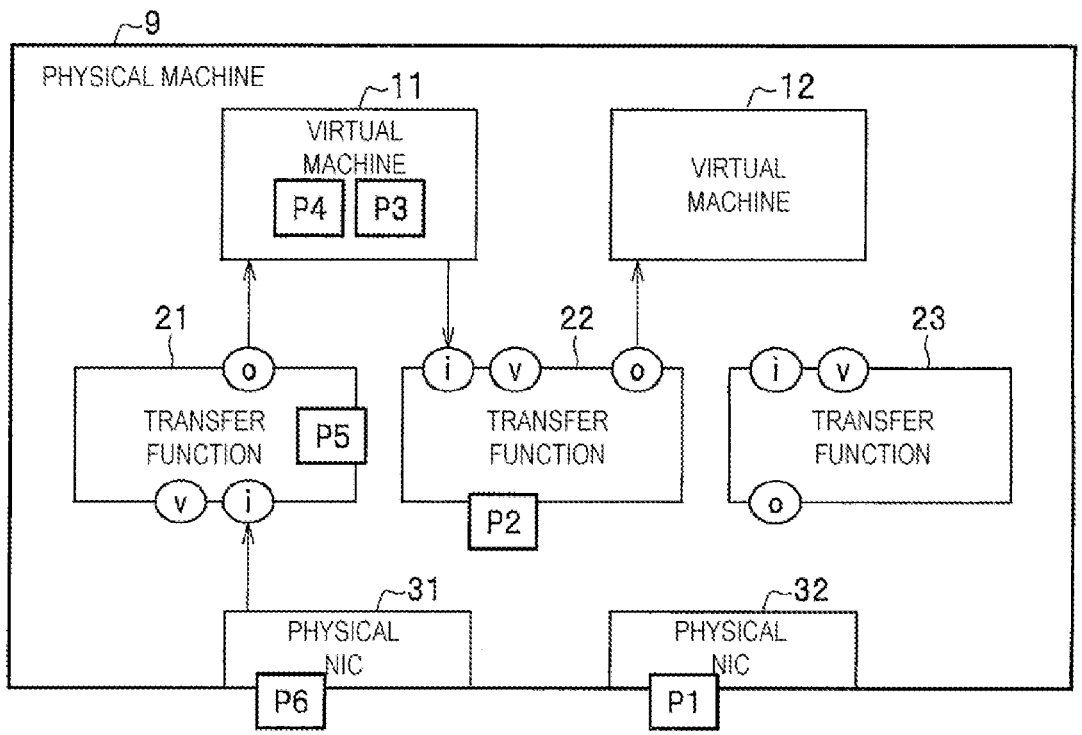
FIG. 19 is an example of a configuration illustrating a state of a third step in which the added virtual machine is incorporated into the path according to the present embodiment.
Figure 20:
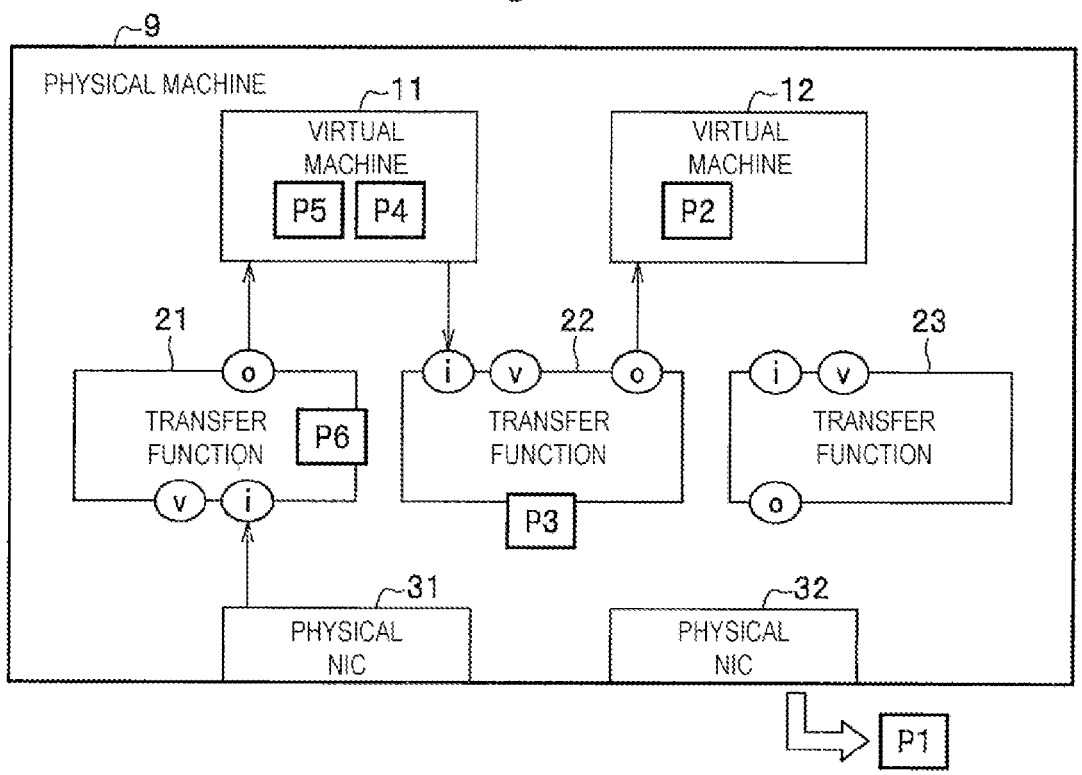
FIG. 20 is an example of a configuration illustrating a state of a fourth step in which the added virtual machine is incorporated into the path according to the present embodiment.

In FIG. 19, the output destination of the transfer function 22 is changed from the physical NIC 32 to the virtual machine 12 in accordance with the first addition instruction. This causes the packets P2 pruned from the input IF of the transfer function 22 to be transferred to the virtual machine 12 so that the virtual machine 12 is incorporated into the changed path (FIG. 20). Similarly, the transfer function 22 also prunes the subsequent packet P3 from the input IF.

Figure 21:
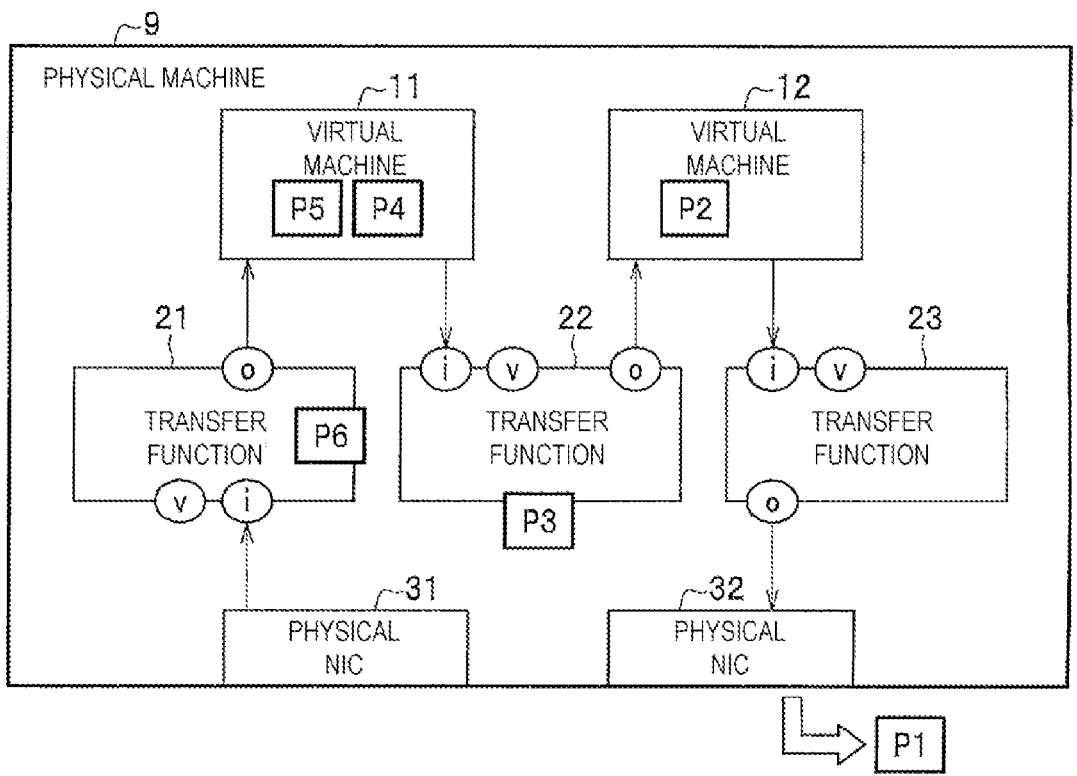
FIG. 21 is an example of a configuration illustrating a state of a fifth step in which the added virtual machine is incorporated into the path according to the present embodiment.
Figure 22:
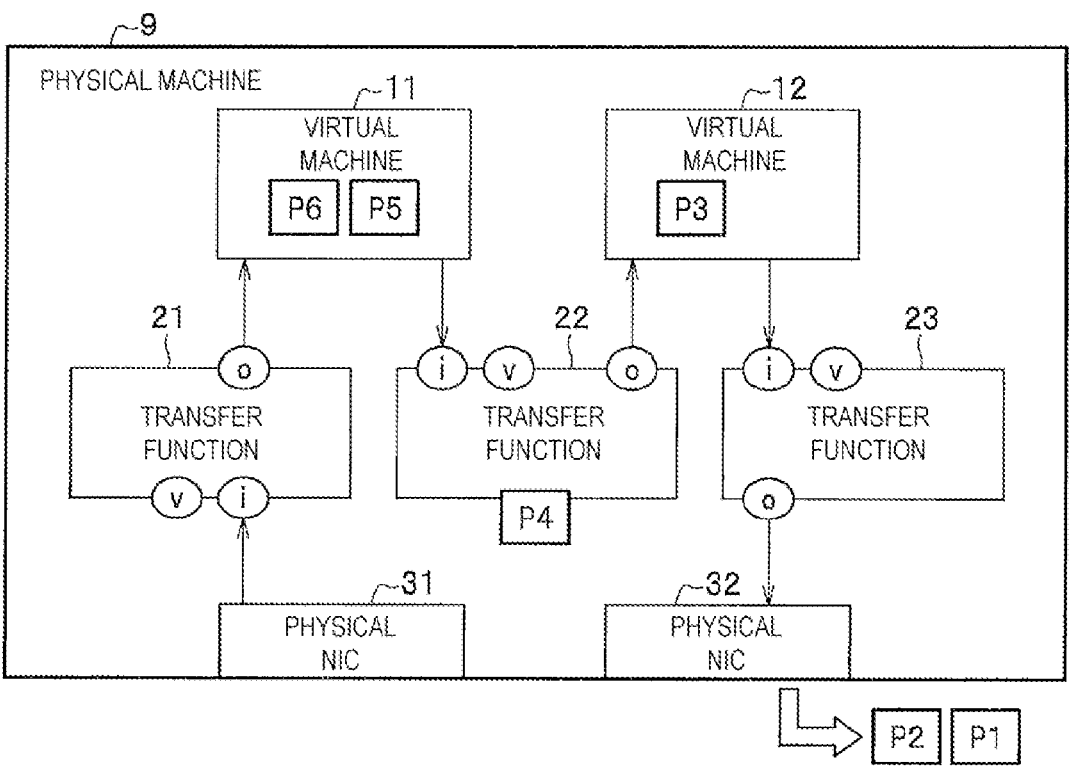
FIG. 22 is an example of a configuration illustrating a state of a sixth step in which the added virtual machine is incorporated into the path according to the present embodiment.

In FIG. 21, the transfer function 23 which has been activated in accordance with the second addition instruction sets its own input source to the virtual machine 12 and sets its own output destination to the physical NIC 32. This causes the packets P2, P3, . . . processed by the virtual machine 12 to be transferred out of the physical NIC 32 in order via the transfer function 23 (FIG. 22).

In this manner, because packet loss due to the queuing in virtual machine does not occur during addition, the redundant IF does not need to be used.

As described above, in the present embodiment, the function addition and removal determination unit 41 in the patch controller 4 specifies the removal location of the virtual machine 10, and controls each of the transfer functions 20 in the vicinity of the removal location to form a bypass path that discharges the packet in the to-be-deleted node, and a changed path that disconnects the to-be-deleted node.

Each transfer function 20 can efficiently transfer packets in the to-be-deleted node and prevent packet loss, by operating the system switching unit 200 such that packets on the bypass path flow to the downstream side via the redundant queue 213 with priority over packets on the normal path. That is, the virtual machine can be removed efficiently.

Note that, although, in the present embodiment, the internal configuration of the physical machine 9 has been described with two virtual machines 10, three transfer functions 20, and two physical NICs 30 as illustrated in FIG. 1, the disclosure is not limited to these numbers and configurations. Further, the present invention may be realized using a program that causes hardware resources of a general computer to operate as each unit of the patch controller 4. The program may be distributed via a communication line, or recorded on a recording medium such as a CD-ROM for distribution.

REFERENCE SIGNS LIST

4 Patch controller (function cooperation device)
9 Physical machine
11 to 13 (10) Virtual Machine
21 to 24 (20) Transfer function (transfer unit)
31, 32 (30) Physical NIC (physical interface)
41 Function addition and removal determination unit
211 System switching unit
221 System switching unit
231 System switching unit

The invention claimed is:

1. A function cooperation device for controlling a physical machine that forms a virtual path comprising a plurality of nodes for transferring a packet between a plurality of physical interfaces that transmit and receive packets to and from an external network and a plurality of virtual machines built in the physical machine comprising:
   a memory; and
   a processor coupled to the memory and configured to:
      monitor communication between the plurality of nodes on the virtual path, the plurality of nodes on the virtual path comprising the plurality of virtual machines, the plurality of physical interfaces, and a plurality of transfer units, wherein each transfer unit comprises one or more queues and is configured to transfer communication between the plurality of physical interfaces and the plurality of virtual machines;
      detect a to-be-deleted node, the to-be-deleted node comprising a first virtual machine, of the plurality of virtual machines on the virtual path;
      when removal of the to-be-deleted node on the virtual path is detected, extract each of (i) a node immediately before deletion that is located adjacently to the to-be-deleted node and on an upstream side of the to-be-deleted node on the virtual path, (ii) a node immediately after deletion that is located adjacently to the to-be-deleted node and on a downstream side of the to-be-deleted node, (iii) a deletion input transfer unit within the plurality of transfer units, configured to transfer a packet from the node immediately before deletion to the to-be-deleted node, and (iv) a deletion output transfer unit within the plurality of transfer units, configured to transfer a packet from the to-be-deleted node to the node immediately after deletion;
      form a bypass path on which a queued packet being processed by the to-be-deleted node is located, wherein the bypass path defines a connection from the to-be-deleted node to the deletion output transfer unit and from the deletion output transfer unit to the deletion input transfer unit, and wherein the queued packet on the bypass path is enqueued into a first input queue of the deletion input transfer unit through the bypass path;
      form a changed path from the node immediately before deletion to the node immediately after deletion by changing a packet output destination of the deletion input transfer unit from the to-be-deleted node to the node immediately after deletion, wherein the node immediately before deletion includes a transfer packet that is enqueued into a second input queue of the deletion input transfer unit; and
      preventing packet loss of the queued packet being processed by the to-be-deleted node by prioritizing (a) processing of discharging the queued packet on the bypass path over (b) processing of transferring the transfer packet on the changed path, wherein the prioritizing comprises:
         discharging the first input queue of the deletion input transfer unit that includes the queued packet on the bypass path to the node immediately after deletion; and
         after discharging the first input queue, transferring the second input queue including the transfer packet to the node immediately after deletion over the changed path.

2. A virtual machine communication system comprising:
   a plurality of physical interfaces configured to transmit and receive a packet to and from an external network including a physical interface on an input side and a physical interface on an output side;
   a physical machine configured to transfer the packet to and from a plurality of virtual machines built in the physical machine via a plurality of transfer units including one or more processors; and
   a function cooperation device, implementing in a processor coupled to a memory, configured to control the transfer unit in the physical machine,
   wherein the function cooperation device is configured to,
      monitor communication between the plurality of virtual machines, the plurality of physical interfaces, and the plurality of transfer units, wherein each transfer unit comprises one or more queues;
      detect removal of a virtual machine within the plurality of virtual machines;
      when removal of a virtual machine within the plurality of virtual machines that is a to-be-deleted node is detected, extract each of (i) a node immediately before deletion that is located on an upstream side of the to-be-deleted node and (ii) a node immediately after deletion located on a downstream side of the to-be-deleted node, (iii) a deletion input transfer unit within the plurality of transfer units, configured to transfer a packet from the node immediately before deletion to the to-be-deleted node, and (iv) a deletion output transfer unit within the plurality of transfer units, configured to transfer a packet from the to-be-deleted node to the node immediately after deletion;
      form a bypass path on which a queued packet being processed by the to-be-deleted node is located, wherein the bypass path defines a connection from the to-be-deleted node to the deletion output transfer unit and from the deletion output transfer unit to the deletion input transfer unit, and wherein the queued packet on the bypass path is enqueued into a first input queue of the deletion input transfer unit through the bypass path;
      form a changed path from the node immediately before deletion to the node immediately after deletion by changing a packet output destination of the deletion input transfer unit from the to-be-deleted node to the node immediately after deletion, wherein the node immediately before deletion includes a transfer packet that is enqueued into a second input queue of the deletion input transfer unit;

prevent packet loss of the packet being processed by the to-be-deleted node by prioritizing(a) processing of discharging the packet from the second input queue over (b) processing of transferring the packet from the first input queue, wherein the prioritizing comprises:
discharging the first input queue of the deletion input transfer unit that includes the packet from the second input queue into the node immediately after deletion, in response to determining that the packet is present in the second input queue; and
after discharging first input queue the packet from the second input queue, transferring the second input queue including the transfer packet to the node immediately after deletion over the changed path.

3. The virtual machine communication system according to claim 2,
wherein according to wherein the plurality of transfer units are configured to transfer a packet in order of the physical interface on the input side, one or more of the plurality of virtual machines, the virtual machine of the to-be-deleted node, and the physical interface on the output side; and
the deletion input transfer unit is configured to switch the packet output destination from the virtual machine, which is the to-be-deleted node, to the physical interface on the output side which is the node immediately after deletion.

4. The virtual machine communication system according to claim 2,
wherein the plurality of transfer units are configured to transfer a packet in order of the physical interface on the input side, one or more of the plurality of virtual machines, and the physical interface on the output side; and
the deletion input transfer unit is configured to switch the packet output destination from the virtual machine, which is the to-be-deleted node, to a virtual machine within the plurality of virtual machines, which is the node immediately after deletion.

5. A function cooperation method executed by a function cooperation device for controlling a physical machine that forms a virtual path comprising a plurality of nodes for transferring a packet between a plurality of physical interfaces that transmit and receive packets to and from an external network and a plurality of virtual machines built in the physical machine, the method comprising:
monitoring communication between the plurality of nodes on the virtual path, the plurality of nodes on the virtual path comprising the plurality of virtual machines, the plurality of physical interfaces, and a plurality of transfer units, wherein each transfer unit comprises one or more queues and is configured to transfer communication between the plurality of physical interfaces and the plurality of virtual machines;
detecting a to-be-deleted node, the to-be-deleted node comprising a first virtual machine, of the plurality of virtual machines on the virtual path;
when removal of the to-be-deleted node on the virtual path is detected, extracting, by the function cooperation device, each of (i) a node immediately before deletion that is located adjacently to the to-be-deleted node and on an upstream side of the to-be-deleted node on the virtual path, (ii) a node immediately after deletion that is located adjacently to the to-be-deleted node and on a downstream side of the to-be-deleted node, (iii) a deletion input transfer unit within the plurality of transfer units, configured to transfer a packet from the node immediately before deletion to the to-be-deleted node, and (iv) a deletion output transfer unit within the plurality of transfer units, configured to transfer a packet from the to-be-deleted node to the node immediately after deletion;
forming, by the function cooperation device, a bypass path on which a queued packet being processed by the to-be-deleted node is located, wherein the bypass path defines a connection from the to-be-deleted node to the deletion output transfer unit and from the deletion output transfer unit to the deletion input transfer unit, and wherein the queued packet on the bypass path is enqueued into a first input queue of the deletion input transfer unit through the bypass path;
forming a changed path from the node immediately before deletion to the node immediately after deletion by changing a packet output destination of the deletion input transfer unit from the to-be-deleted node to the node immediately after deletion, wherein the node immediately before deletion includes a transfer packet that is enqueued into a second input queue of the deletion input transfer unit; and
preventing packet loss of the queued packet being processed by the to-be-deleted node by prioritizing (a) processing of discharging the queued packet on the bypass path over (b) processing of transferring the transfer packet on the changed path, wherein the prioritizing comprises:
discharging the first input queue of the deletion input transfer unit that includes the queued packet on the bypass path to the node immediately after deletion ; and
after discharging the first input queue, transferring the second input queue including the transfer packet to the node immediately after deletion over the changed path.

* * * * *